US012509928B2

(12) United States Patent
Klockow et al.

(10) Patent No.: US 12,509,928 B2
(45) Date of Patent: Dec. 30, 2025

(54) SIDE PANEL LATCH ASSEMBLY FOR AN INCUBATOR

(71) Applicant: GE Precision Healthcare LLC, Wauwatosa, WI (US)

(72) Inventors: Helge B. Klockow, Wauwatosa, WI (US); Mohanavenkatesh Thangavelu, Bangalore (IN); Shahasan Noushad, Waukesha, WI (US); Steven M. Falk, Laurel, MD (US); Thomas Ziegler, Jettingen (DE); Dominik Wandel, Leonberg (DE); Hendrik Hug, Sindelfingen (DE)

(73) Assignee: GE PRECISION HEALTHCARE LLC, Waukesha, WI (US)

( * ) Notice: Subject to any disclaimer, the term of this patent is extended or adjusted under 35 U.S.C. 154(b) by 1114 days.

(21) Appl. No.: 17/500,273

(22) Filed: Oct. 13, 2021

(65) Prior Publication Data

US 2023/0111382 A1 Apr. 13, 2023

(51) Int. Cl.

*E05C 1/10* (2006.01)
*A61G 11/00* (2006.01)
*E05C 1/00* (2006.01)

(52) U.S. Cl.

CPC .............. *E05C 1/10* (2013.01); *A61G 11/006* (2013.01); *E05C 1/004* (2013.01); *A61G 11/005* (2013.01)

(58) Field of Classification Search

CPC ... E05C 1/10; E05C 1/004; E05C 1/00; A61G 11/006; A61G 11/005; A61G 11/00

(Continued)

(56) References Cited

U.S. PATENT DOCUMENTS 6,592,511 B2 7/2003 Honma et al.
6,929,597 B2 8/2005 Hampe (Continued)

FOREIGN PATENT DOCUMENTS

EP 2707563 B1 12/2018
EP 4177428 A2 * 5/2023 ........... A61G 11/006

OTHER PUBLICATIONS

EP application 22199541.8 filed Oct. 4, 2022—Search Report issued Aug. 7, 2023; 12 pages.

(Continued)

*Primary Examiner* — Robert G Santos

(74) *Attorney, Agent, or Firm* — Andrus Intellectual Property Law, LLP

(57) ABSTRACT

A neonatal incubator system includes an enclosure having side panels that create a chamber that receives an infant. At least one of the side panels is movable between an upright closed position and a retracted open position. A side panel latch assembly is positioned to permit and prevent movement of the movable side panel between the open and closed positions. The side panel latch assembly includes a movable latch lever having a primary latch member and a secondary latch member that are spaced from each other. The primary latch member engages a first catch on a latch receptable to hold the side panel latch assembly in the latched position. The secondary latch member engages a second catch on the latch receptacle when the side panel is partially open. The primary and secondary latch members move together with the latch lever to release both the primary and secondary latch members.

9 Claims, 13 Drawing Sheets

(58) Field of Classification Search
USPC ........................... 5/97, 100, 93.1; 600/22, 21
See application file for complete search history.

(56) References Cited

U.S. PATENT DOCUMENTS

| | | | | |
|---|---|---|---|---|
| 7,674,223 | B2 * | 3/2010 | Jones | A61G 11/009 5/655 |
| 9,011,313 | B2 | 4/2015 | Matsubara | |
| 10,550,614 | B2 | 2/2020 | Kalathil | |
| 10,617,585 | B2 | 4/2020 | Hampe et al. | |
| 11,090,212 | B2 | 8/2021 | Ghosh et al. | |
| 2002/0019578 | A1 | 2/2002 | Honma et al. | |
| 2005/0020872 | A1 | 1/2005 | Hampe | |
| 2006/0218727 | A1 | 10/2006 | Jones | |
| 2007/0175891 | A1 | 8/2007 | Maeda | |
| 2012/0269568 | A1 * | 10/2012 | Matsubara | A61G 11/006 403/104 |
| 2016/0052231 | A1 | 2/2016 | Iacobucci | |
| 2016/0113415 | A1 | 4/2016 | Albregts et al. | |
| 2020/0345570 | A1 | 11/2020 | Ghosh et al. | |
| 2023/0111382 | A1 * | 4/2023 | Klockow | E05C 1/10 5/97 |

OTHER PUBLICATIONS

EP application 22199541.8 filed Oct. 4, 2022—partial Search Report issued Mar. 15, 2023; 11 pages.

* cited by examiner

SIDE PANEL LATCH ASSEMBLY FOR AN INCUBATOR

BACKGROUND

The present disclosure generally relates to neonatal care systems, and more specifically to a side panel latch assembly for securing a side panel that forms part of an enclosure of the neonatal incubator.

Some neonates are not physiologically well enough developed to be able to survive without special medical attention. A frequently used medical aid for such infants is the incubator. The primary objective of the incubator is to provide an environment which will maintain the neonate at a minimum metabolic state thereby permitting as rapid physiological development as possible. Neonatal incubators create a microenvironment that is thermally neutral where a neonate can develop. These incubators typically include a humidifier and a heater and associated control system that controls the humidity and temperature in the neonatal microenvironment. The humidifier comprises a device that evaporates an evaporant, such as distilled water, to increase relative humidity of air within the neonatal microenvironment. The humidifier is typically controllable such that the amount of water, or water vapor, added to the microenvironment is adjustable in order to control the humidity to a desired value. The heater may be, for example, an air heater controllable to maintain the microenvironment area to a certain temperature. Radiant warmers may be used instead of incubators for some neonates where less environmental control is required. In still other embodiments, hybrid incubator/radiant warming systems may be utilized, various embodiments of which are well known in the art.

Since the microenvironment is accurately controlled in a neonatal care system, the care system includes an enclosure that is sealed as best possible to help maintain the controlled microenvironment. Such enclosure will typically include four sidewalls or side panels and a top hood that surround an infant support platform. Typically, one or more of the side panels can be moved to an access position in which the side panel is folded down to provide complete access to the open interior of the enclosure to allow a caregiver to have access to the infant and equipment within the enclosure. Each side panel includes one or more latch assemblies that securely hold the side panel in the raised position.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

A neonatal incubator system for use with an infant includes an enclosure that creates a chamber that is designed to receive the infant. The enclosure is formed from a plurality of side panels where at least one of the side panels is movable between an upright closed position and a retracted open position. At least one side panel latch assembly is position to engage the movable side panel when the side panel is in the closed position to securely retain the side panel in the closed position. The side panel latch assembly can be moved away from the latched position to allow the side panel to rotate from the upright closed position to the retracted open position.

The side panel latch assembly includes a latch receptacle that includes both a first catch and a second catch. The first and second catches are spaced from either other on the latch receptacle. The side panel latch assembly further includes a latch base mounted to the movable side panel and a latch lever that is movably mounted to the latch base. In one exemplary embodiment, one or more bias springs are positioned between the latch base and the latch lever to bias the latch lever into an upper, latched position.

The latch lever of the side panel latch assembly includes a primary latch member and a secondary latch member that are both located on the latch lever. The latch lever is configured such that the primary latch member engages the first catch on the latch receptacle and the secondary latch member engages the second catch of the latch receptacle. The latch lever and the latch receptacle are configured such that the latch lever is movable relative to the latch base between an extended latching position and a retracted release position. The primary latch member is disengaged from the first catch and the secondary latch member is disengaged from the second catch when the latch lever is in the retracted release position such that the side panel can be moved to the open position by depressing only the single latch lever.

The primary latch member and the secondary latch member are spaced from each other such that the primary latch member engages the first catch and the secondary latch member is spaced from the second catch when the movable side panel is in the completely closed upright position and the latch assembly is in the latched position. The spacing between the primary and secondary latch members allows the secondary latch member to engage the second catch and the primary latch member to be spaced from the first catch when the movable side panel is positioned in an intermediate position between the closed position and the open position. Since the primary latch and the secondary latch are on the single latch lever, the latch lever can be released from the retracted release position to allow the secondary latch member to engage the second catch to hold the movable side panel in the intermediate position. In an exemplary embodiment, the intermediate position is a position when the side panel has rotated less than 12 degrees from the closed position.

Another embodiment of the present disclosure is directed to a side panel latch assembly for use with a neonatal incubator system including an enclosure that creates a chamber around an infant. The enclosure includes a series of side panels where at least one of the side panels is movable between an upright closed position and a retracted open position. The side panel latch assembly includes a latch receptacle that is mounted to one of the side panels and includes a first catch and a second catch. A latch base is mounted to the movable side panel and receives a movable latch lever. The latch lever includes both a primary latch member and a secondary latch member spaced from the primary latch member. When the latch assembly is in the latch position, the primary latch member engages the first catch and the secondary latch member is spaced from the second catch to secure the movable side panel in the closed position. To move the side panel toward the open position, the latch lever is depressed against a bias force and the latch lever moves relative to the latch base. This movement moves the primary and secondary latch members below the first and second catches to allow pivoting movement of the side panel.

If the side panel is only moved to an intermediate position, the secondary latch member will contact and engage the second catch while the primary latch member is spaced away from the first catch. In this manner, the secondary latch member of the latch assembly holds the side panel in the intermediate position to prevent movement of the side panel to the retracted open position.

Various other features, objects, and advantages of the invention will be made apparent from the following description taken together with the drawings.

BRIEF DESCRIPTION OF THE DRAWINGS

The drawings illustrate the best mode presently contemplated of carrying out the disclosure. In the drawings.

Figure 1A:
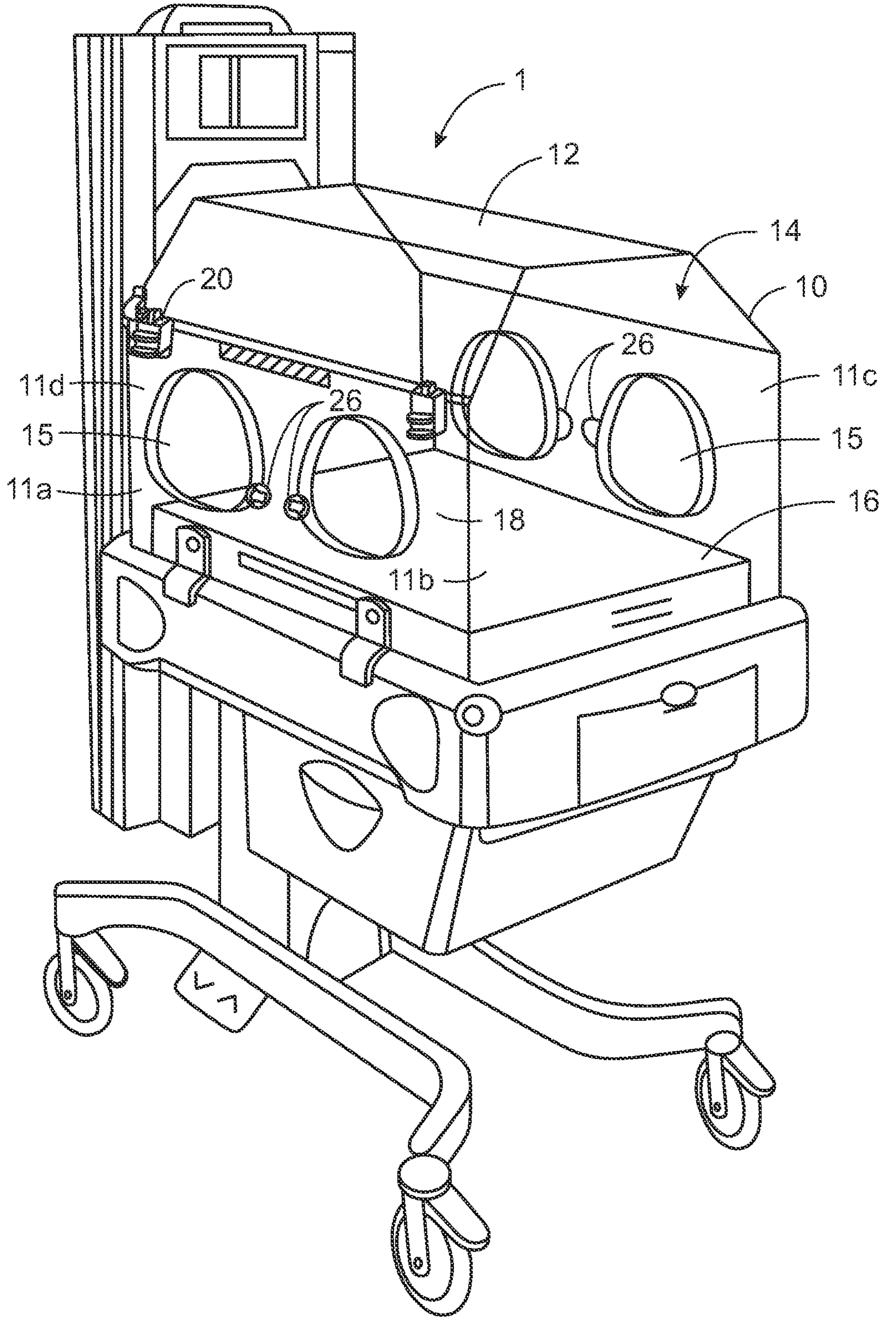
FIG. 1A is a perspective view of an exemplary neonatal incubator system in accordance with one embodiment of the present disclosure.

The drawings illustrate specific aspects of the described components, systems and methods for providing a neonatal incubator system. Together with the following description, the drawings demonstrate and explain the principles of the structures, methods, and principles described herein. In the drawings, the thickness and size of components may be exaggerated or otherwise modified for clarity. Well-known structures, materials, or operations are not shown or described in detail to avoid obscuring aspects of the described components, systems and methods.

DETAILED DISCLOSURE

The inventors have recognized a problem with current incubator systems for neonatal care, which is that many incubator systems have one or more movable side panels that can be propped up in such a way that it seems that the side panels are latched when they are not. Having a side panel to an incubator in an upright, but unlatched position presents a risk that the side panel could be inadvertently opened and put a neonate at risk. For example, the neonate could fall out of the incubator if the side panel is accidentally opened, or the neonate may be insufficiently protected from impacts or from outside environmental conditions. While some incubator systems include indicators on latches to indicate when the latch is in a locked or unlocked position, such indicators are often missed by caregivers who may inadvertently allow a side panel to remain unlatched while thinking and behaving as if the side panel is latched and thus securely closed.

Accordingly, the inventors have developed the current system that prevents a side panel, or door, of an incubator enclosure from remaining in what appears to be a closed or near-closed position without the side wall panel being latched. The disclosed neonatal incubator system includes a primary latch and a secondary latch as part of a latching assembly included between the side panels of the enclosure. The two separate primary and secondary latches are moveable together through a single action by the user and can be selectively positioned to ensure that the side panel remains in a latched condition when the side panel is partially open but not open far enough to cause the side panel to fall to the fully open position due to gravity. In various embodiments, the latching assembly may prevent the movable side panel from staying in a near-closed, or intermediate position between fully open and fully closed, without the side panel being latched by a secondary latch.

In the above description, certain terms have been used for brevity, clarity, and understanding. No unnecessary limitations are to be inferred therefrom beyond the requirement of the prior art because such terms are used for descriptive purposes and are intended to be broadly construed. The different systems and method steps described herein may be used alone or in combination with other systems and methods. It is to be expected that various equivalents, alternatives and modifications are possible within the scope of the appended claims.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

FIG. 1A depicts one embodiment of an incubator system having an enclosure 10 with one or more side panel latching assemblies 20. As will be understood by a person having ordinary skill in the art, the disclosed system and method may be implemented on various types of incubator systems, including incubator/warmer systems and radiant warmer systems having enclosures with movable side panels operable to insert and remove a neonate from a controlled environment enclosable to secure the neonate within an area on the platform 16. The term incubator should be interpreted to cover these various types of incubator systems.

The depicted incubator system 1 includes a base 2 that supports a platform 16 configured for receiving and supporting a neonate. In the depicted embodiment, the base 2 includes a horizontal section comprising a pair of u-shaped horizontal members joined together and providing support for a vertical base member extending upward toward the platform 16. The base 2 may include wheels to provide for ready movement of the incubator system 1. A platform 16 is supported on the vertical base member, which may be a standard platform for supporting a neonate, such as configured to receive a removable mattress or other sleep surface.

The incubator system 1 includes an enclosure 10 defining a chamber 14 creating a microenvironment for housing an infant. The enclosure 10 may be, for example, a transparent housing extending above the platform 16. The enclosure 10 creates and defines a chamber 14 providing a microenvironment, which is an area around the infant where temperature, humidity, and other environmental factors can be controlled.

Figure 1B:
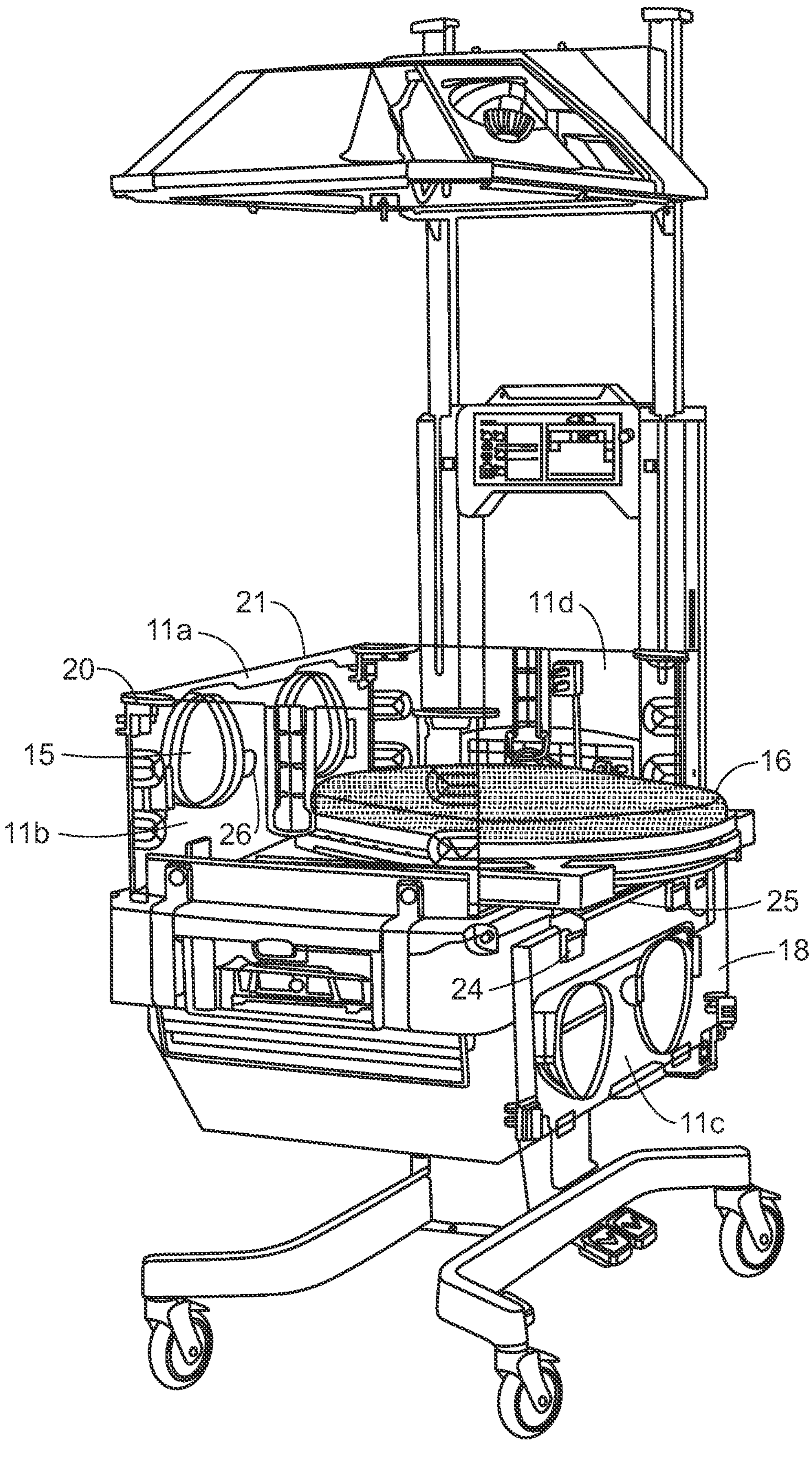
FIG. 1B is another perspective view of another exemplary neonatal incubator system with one of the side panels of the enclosure folded into an access position.

The enclosure 10 includes multiple side walls 11*a*-11*d* and a top portion 12. For example, the side walls 11*a*-11*d* and/or the top portion 12 of the enclosure 10 may be made of a transparent plastic or acrylic material, as is standard in the relevant art. In various embodiments, the top portion 12 may be integrated with the side walls 11*a*-11*d*. In other embodiments, the top portion 12 may be separable from the side walls 11*a*-11*d* of the enclosure 10, as shown in FIG. 1B. In the examples, the enclosure 10 includes a plurality of portholes 15 through which a healthcare provider may access the neonate within the chamber 14. The incubator system 1 may further include a heater used to control the temperature within the microenvironment of the chamber 14. For example, the chamber heater may be a radiant heating or warming device that heats the air within the chamber 14 to a predefined temperature or within a predefined temperature range. In another embodiment, the heater may comprise a convective or conductive heating device or any other type of controllable heating or warming device. The incubator system 1 may further include a humidifier system 6 controllable to adjust the relative humidity within with the chamber 14. For example, the humidifier may include a device that evaporates water, such as distilled water, to increase the relative humidity of air within the chamber 14.

The enclosure 10 includes one or more movable side panels 18 on a side wall 11*a*-11*d* of the enclosure 10. The movable side panel 18 is openable to place an infant on the platform 16 and closable to secure the infant within the chamber 14. The movable side panel 18 may be only part of a side wall 11*a*-11*d* of the enclosure 10, or may comprise the entirety of the side wall 11*a*, 11*c* as shown in the depicted embodiments.

In FIG. 1A, the movable side panel 18 is shown in a fully-closed position. FIG. 1B shows the movable side panel 18 in a fully open position. In certain embodiments exemplified at FIG. 2, the platform 16 may be configured to slide and/or rotate outward when the movable side panel 18 is open to enable easier access to a neonate and/or to enable easy placement of the neonate on the platform 16. The movable side panel 18 has a top side 21 and a bottom side 25. The movable side panel 18 may attach to the enclosure 10 and/or the platform 16 via one or more hinges 24 allowing the movable side panel 18 to be opened and closed. In other embodiments, the movable side panel may attach to a frame 13 or to a side wall 11*a-d* via hinges or other connecting means, such as clips, pins, pressure or frictions fits, etc. In the depicted embodiment, two hinges 24 attach to a lower side 25 of the movable side panel 18 such that the movable side panel 18 rotates downward to a retracted, open position and upward to an upright, closed position. In other embodiments, the movable side panel 18 may rotate clockwise and counter clockwise and one or more hinges 24 may be on a lateral side of the movable side panel 18.

One or more side panel latch assemblies 20 are also provided to engage the movable side panel 18 and maintain the movable side panel in a closed position to secure the infant within the chamber 14 of the incubator system 1. The side panel latch assemblies 20 may be any device or set of devices capable of securing the movable side panel 18 in a closed position, including withstanding at least a predefined amount of force that may push against the movable side panel 18, such as by the infant and/or by elements within the chamber 14 provided as part of the neonatal care (monitors, medical devices, blankets, etc.). Further details of the side panel latch assemblies 20 are set forth below.

As can be seen in FIG. 1B, each of the portholes 15 can be covered by a porthole door that is movable between an open and a closed position to selectively provide access to the chamber defined by the enclosure. In an embodiment such as shown in FIG. 1A in which the enclosure 10 completely surrounds the chamber 14, the portholes 15 allow a caregiver access to an infant positioned within the enclosure 10. Each of the porthole doors is held in a closed position by a rotary latch 26.

Figure 2:
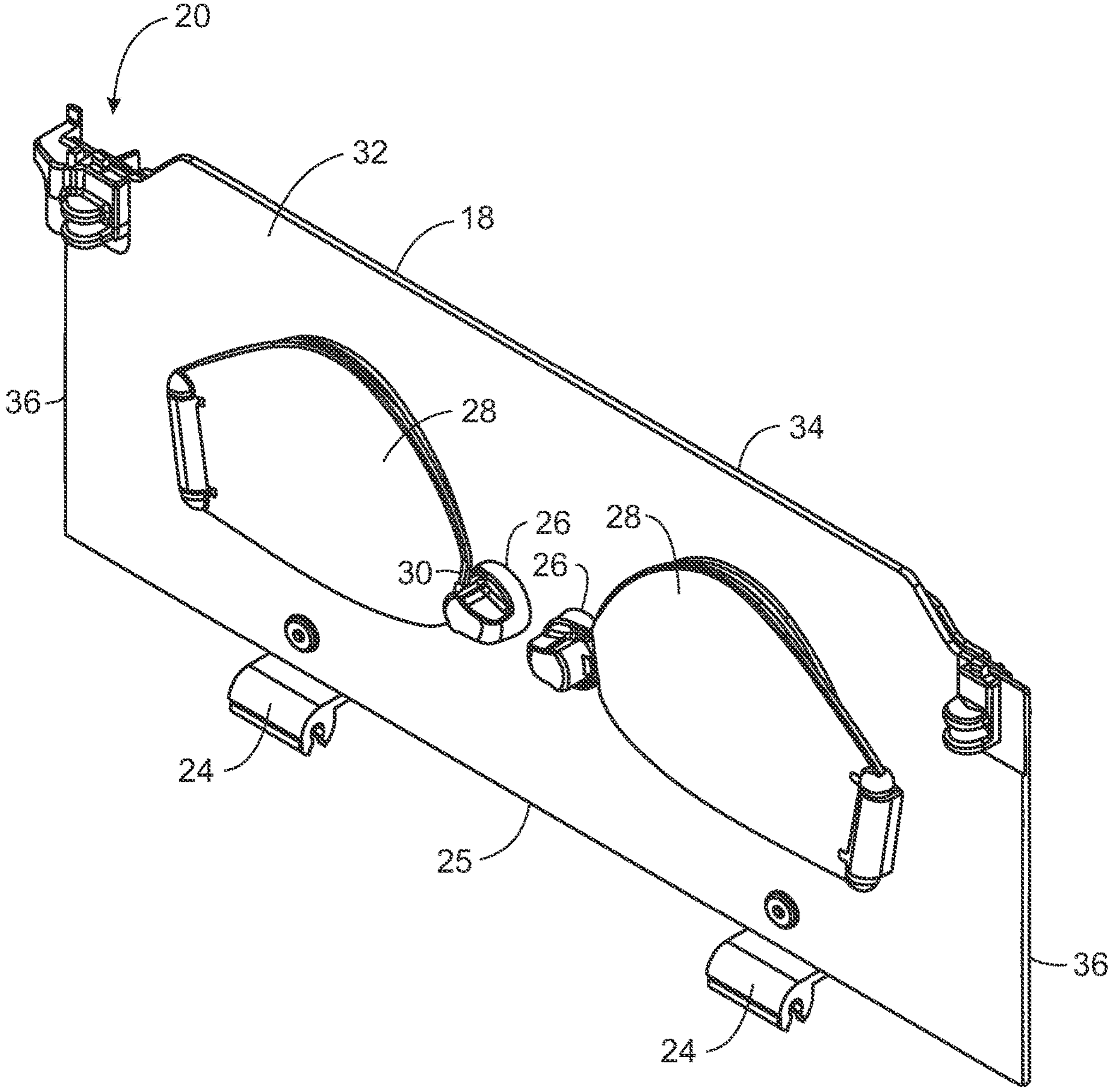
FIG. 2 is a perspective view of one of the side panels that includes one embodiment of the exemplary latch assembly of the present disclosure.
Figure 3:
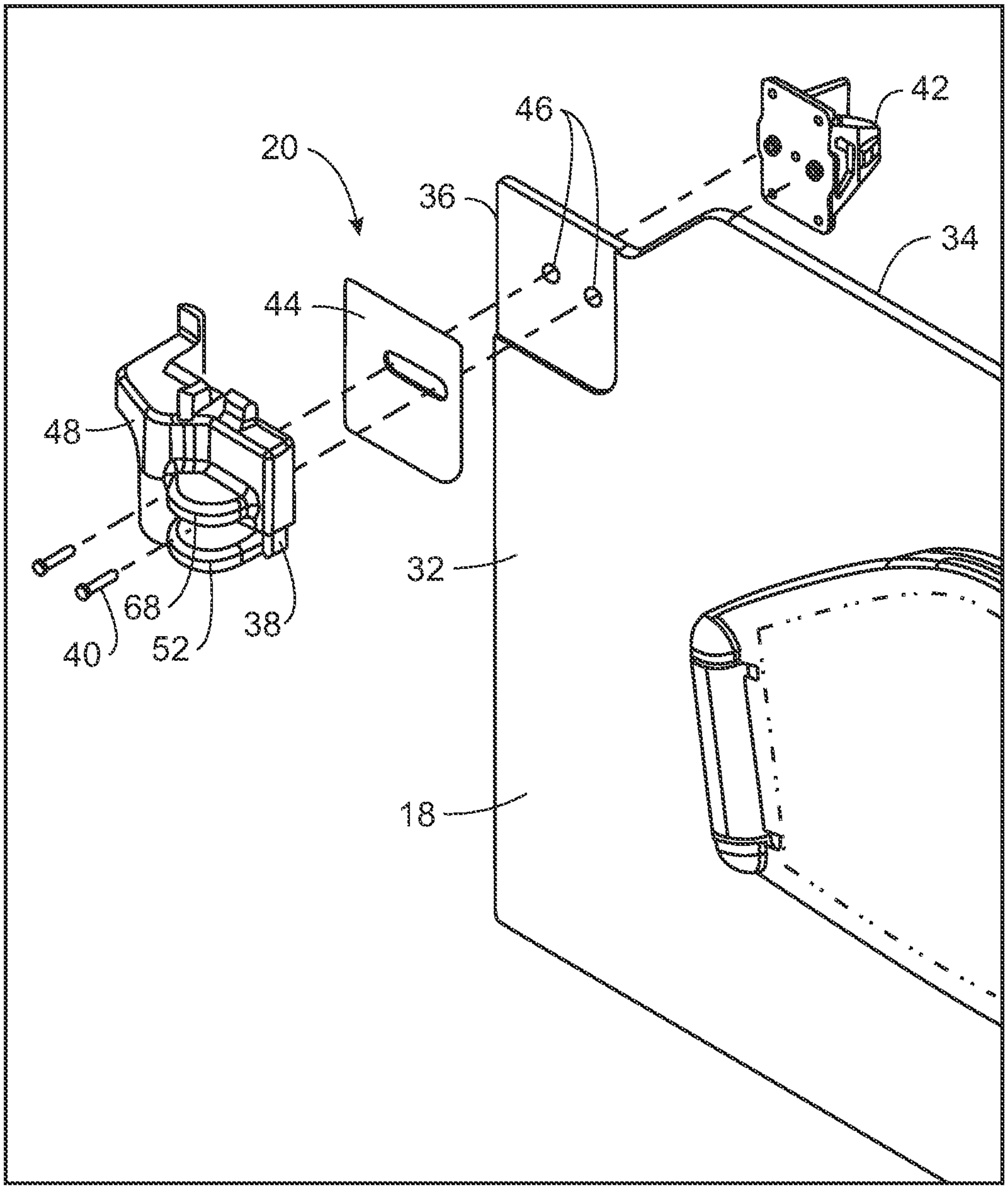
FIG. 3 is an exploded view of a portion of the exemplary latch assembly of the present disclosure.

FIGS. 2 and 3 illustrate the configuration of one of the side panels 18 that includes a pair of porthole doors 28 that are each secured in the closed position shown by one of a pair of rotary latches 26. The rotary latches 26 can be rotated in either a clockwise or counterclockwise direction to release the engagement end 30 of the porthole door 28 to allow the porthole door 28 to open. In the embodiment illustrated, the side panel 18 includes a pair of hinges 24 mounted to the lower side 25 that allows the individual side panel 18 to pivotally move from an upright closed position such as shown in FIG. 1A to the retracted open position such as shown in FIG. 1B. This pivoting movement of the entire side panel 18 allows a caregiver to have access to the open interior defined by the enclosure 10.

In the embodiment illustrated in FIG. 2, the side panel 18 is formed from a sheet of acrylic material that includes a front surface 32 and a back surface 34. The thickness of the acrylic material that forms the side panel 18 can depend upon the desired durability of the enclosure.

In accordance with the present disclosure, each of the side edges 36 of the side panel 18 can include a side panel latch assembly 20 that is used to initially secure the side panel 18 in the upright closed position while allowing a caregiver to operate the side panel latch assembly 20 to release the side panel and allow the side panel 18 to pivotally rotate to the retracted, open position. In the embodiment shown in FIGS. 2 and 3, only a portion of the side panel latch assembly is illustrated. An additional portion of the side panel latch assembly is securely mounted to one of the other adjacent side panels in a manner as will be described in greater detail below.

Referring now to FIG. 3, the side panel latch assembly 20 includes latch base 38 that is designed to receive a pair of connectors 40 that pass through the latch base 38 and are received within a back plate 42. The back plate 42 is positioned against the back surface 34 of the side panel 18 while a flexible gasket 44 is positioned between the latch base 38 and the front surface 32 of the side panel 18. A pair of holes 46 extend through the thickness of the side panel 18 which allows the latch base 38 to be securely connected to the side panel near the side edge 36.

Figure 4:
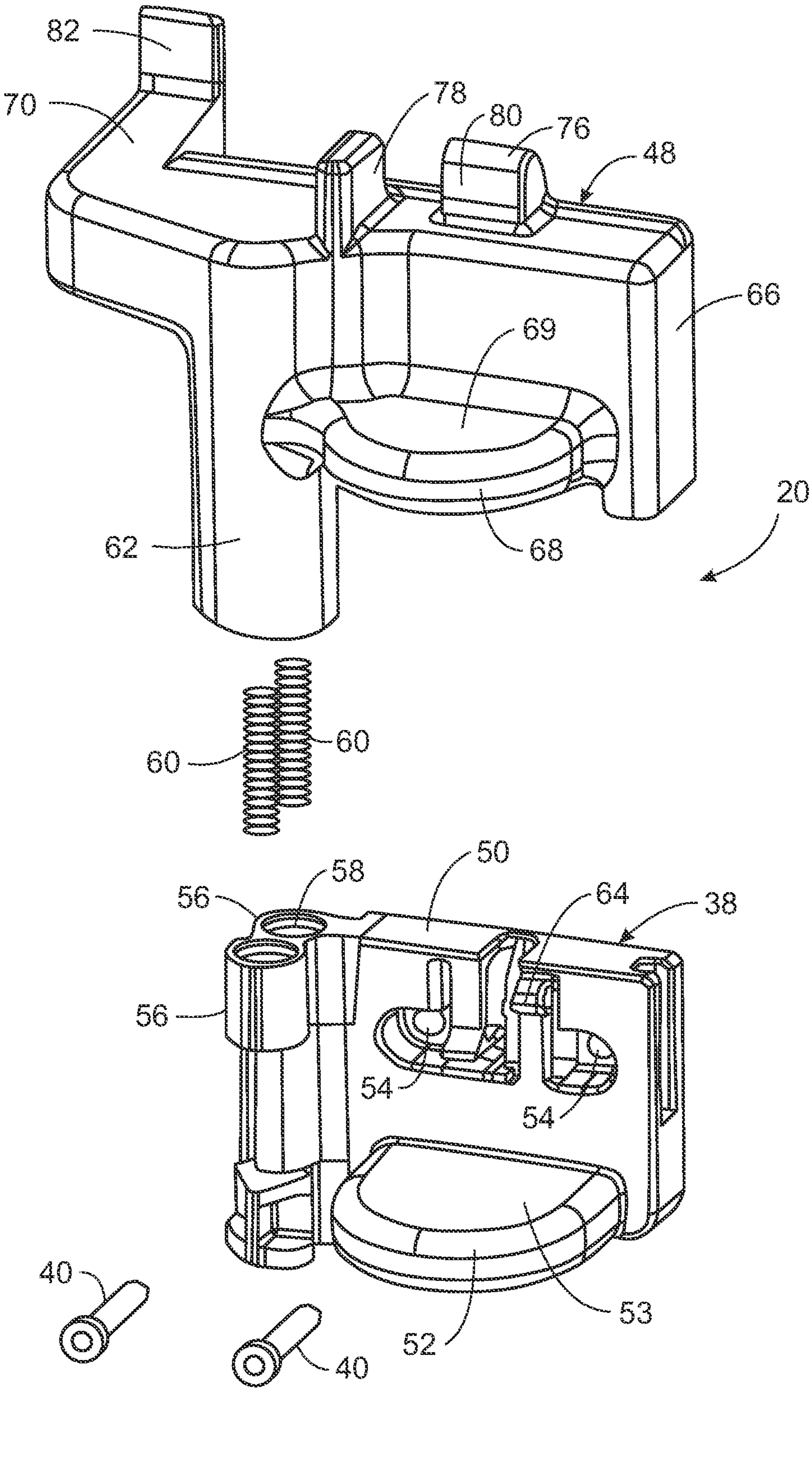
FIG. 4 is an exploded view of the base and latch lever of one embodiment of the present disclosure.

Referring now to FIG. 4, an exploded view of a portion of the side panel latch assembly 20 is illustrated. In the view of FIG. 4, the latch base 38 is shown separated from a latch lever 48. The latch lever 48 is designed to be movable relative to the latch base 38 such that the movement of the latch lever 48 controls the operation of the side panel latch assembly 20.

The latch base 38 includes a main body 50 that includes a lower engagement tab 52 that has a curved outer edge and a flat engagement surface 53 designed to interact with a thumb or fingers of a caregiver. The pair of connectors 40 pass through a pair of access holes 54 that extend through the main body 50 in the manner discussed with reference to FIG. 3. The main body 50 further includes a pair of spring barrels 56 located at one side of the main body 50. The spring barrels 56 each have an open top end 58 that is sized to receive one of a pair of bias springs 60.

After the bias springs 60 are inserted into the pair of spring barrels 56, the latch lever 48 can be positioned above the latch base 38 and moved downward such that the spring tube 62 surrounds and entraps the bias springs 60 within the spring barrels 56. The pair of bias springs 60 act to urge the latch lever 48 upward into the resting position as illustrated in FIG. 3. A retaining tab 64 formed on the latch base 38 interacts with the latch lever 48 to prevent separation of the latch lever 48 from the latch base 38 due to the bias force created by the bias springs 60. A corresponding retaining tab is formed within the main body 66 of the latch lever such that the latch lever 48 is held in place relative to the latch base 38 during operation.

The main body 66 of the latch lever 48 includes an upper engagement tab 68 that includes a flat engagement surface 69 that has the general shape of the lower engagement tab 52. As illustrated in FIG. 3, when the latch lever 48 is installed on the latch base 38, the lower engagement tab 52 is spaced from the upper engagement tab 68. Since the latch base 38 is stationary, when a caregiver depresses the upper engagement tab 68, the entire latch lever 48 moves downward relative to the stationary base 38. This downward movement is against the bias force created by the pair of bias springs 60. The bias springs 60 thus urge the latch lever 48 into the extended latching position shown in FIG. 3 while downward force on the upper engagement tab 68 allows the latch lever 48 to move downward into a retracted, released position. The significance of the latching position and release position will be discussed in greater detail below.

Referring back to FIGS. 4 and 5, the latch lever 48 is formed as an integral injection molded plastic component. The main body 66 includes an extension arm 70 that extends laterally in a first direction 73 from the center axis 72 that extends through the spring tube 62. In addition, the extension arm 70 extends laterally in a second direction 71 from the center axis 72. In the view shown in FIG. 5, the extension arm 70 thus extends to the left (direction 73) of the center axis 72 and away from the center axis 72 (direction 71).

Figure 5:
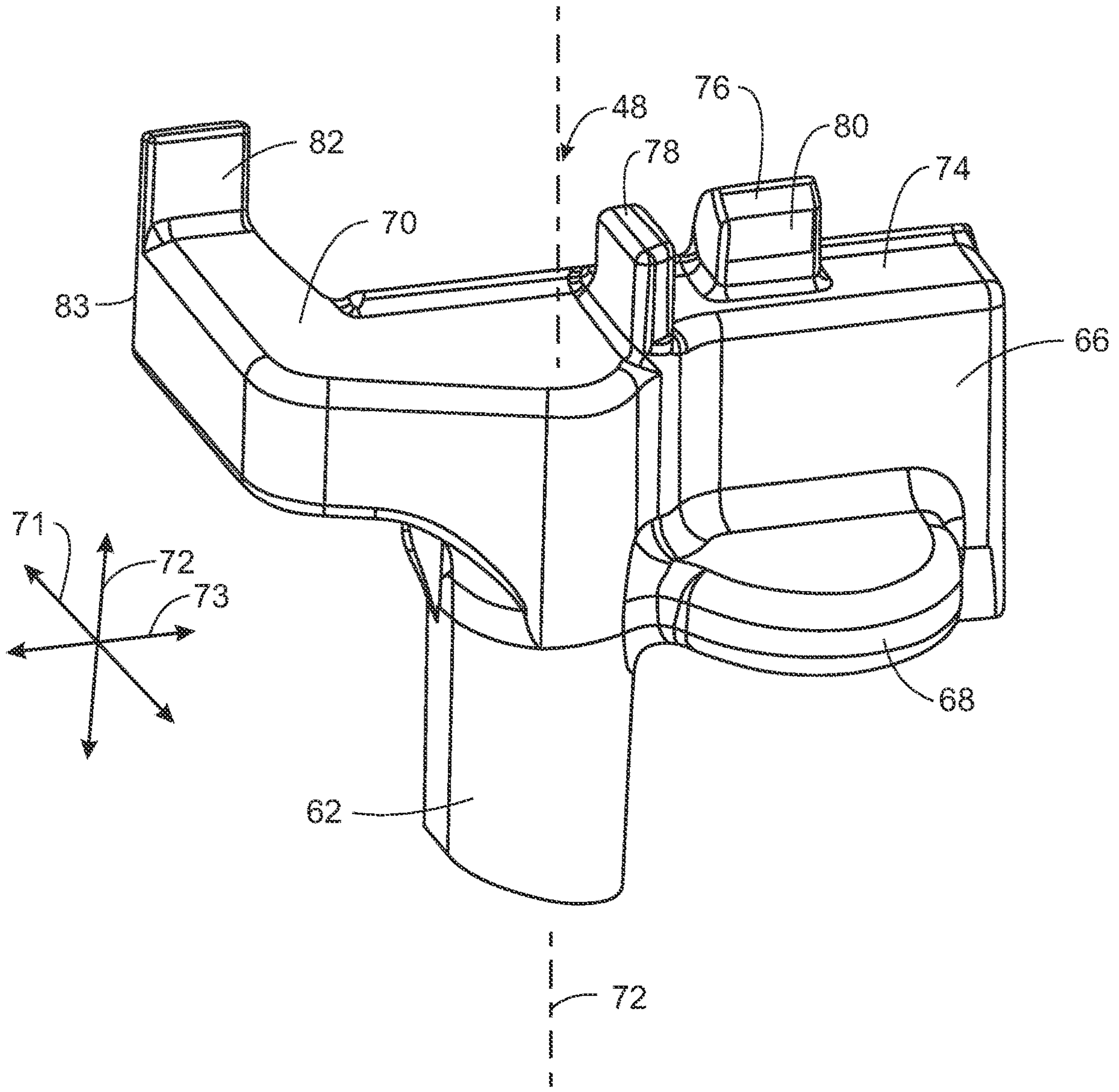
FIG. 5 is a perspective view of the latch lever.

As illustrated in FIG. 5, the main body 66 includes a top surface 74 that defines the uppermost vertical portion of the main body 66. A primary latch member 76 extends above the top surface 74 as does an alignment boss 78. The primary latch member 76 can include a display surface 80 that can include a color, such as red, to indicate that the latch lever 48 is in an unlatched state. The top surface of the 74 latch lever 48 extends across the entire extension arm 70. A secondary latch member 82 is formed at the longitudinal end 83 of the extension arm 70 and extends upward from the top surface 74. As can be understood in FIGS. 4 and 5, the secondary latch member 82 is longitudinally spaced from the primary latch member along the longitudinal axis 71 shown in FIG. 5.

Figure 6:
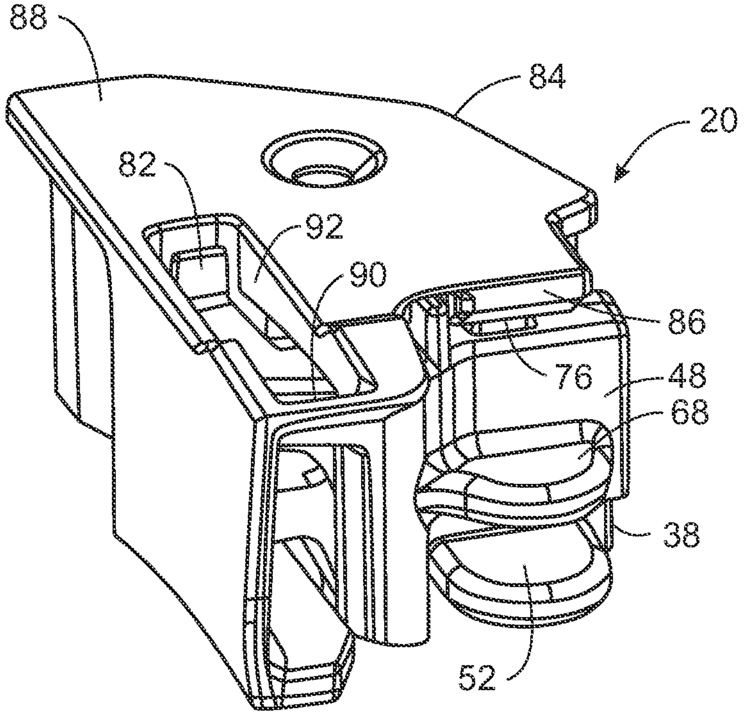
FIG. 6 is a perspective view of a first embodiment of the assembled latch assembly of the present disclosure.
Figure 8:
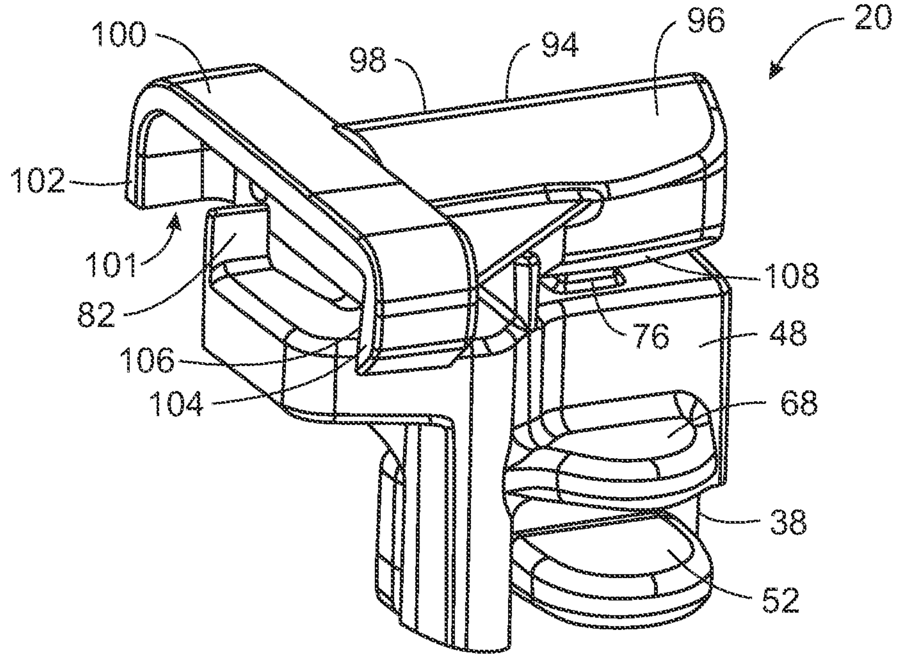
FIG. 8 is a perspective view of a second embodiment of the assembled latch assembly of the present disclosure.

FIG. 6 illustrates a first embodiment of the entire side panel latch assembly 20 of the present disclosure while FIG. 8 illustrates a second embodiment of the entire side panel latch assembly 20. In both of the two embodiments shown in FIGS. 6 and 8, a similar latch base 38 and the same latch lever 48 are used with two different types of latch receptacles. The operation of the latch lever and latch base are the same in both of the two embodiments shown in FIGS. 6 and 8. However, the latch receptacle that forms the remaining component of the side panel latch assembly 20 varies across the two embodiments. The two different embodiments shown in FIGS. 6 and 8 allow the side panel latch assembly 20 to be utilized with different types of incubators while performing substantially the same function as will be described in much greater detail below.

Figure 7:
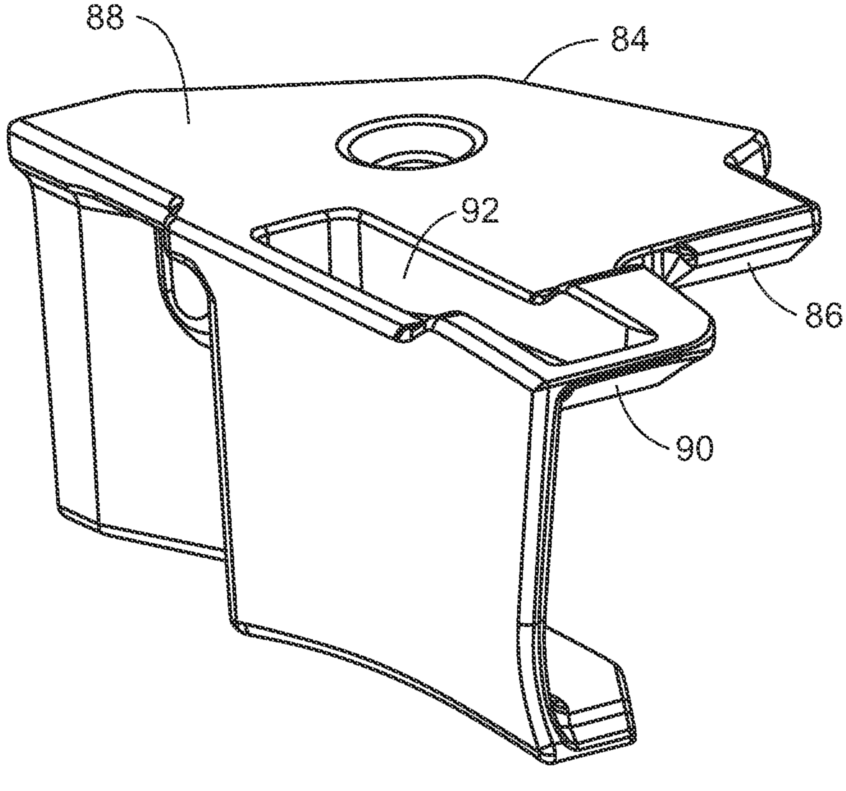
FIG. 7 is a perspective view of the latch receptacle of the first embodiment of the latch assembly of the present disclosure.

Referring first to FIGS. 6 and 7, the first embodiment of the side panel latch assembly 20 includes a first latch receptacle 84. The first latch receptacle 84 is an injection molded plastic component that can be securely mounted to one of the side panels adjacent to the movable side panel that includes both the latch base 38 and the latch lever 48. As illustrated in FIG. 6, the first latch receptacle 84 includes a first catch 86 that extends downward from the top surface 88. The first catch 86 is designed and configured to contact the primary latch member 76 to prevent the movable side panel from moving away from the stationary latch receptacle 84 in the latched position. Since the latch receptacle 84 is stationary and mounted to one of the side panels during use of the incubator, when the primary latch member 76 is in contact with the first catch 86, the physical interaction between these components prevents the movable side panel from rotating away from the upright closed position. In FIG. 6, the side panel latch assembly 20 is shown in its fully latched position. In the fully latched position, the secondary latch member 82 is spaced away from the second catch 90. The second catch 90 is formed at the front end of a movement channel 92 that is formed in the top surface 88 of the latch receptacle 84. The movement channel 92 allows the secondary latch member to freely move during the initial movement of the side panel as the side panel is opened.

When the caregiver wants to open the movable side panel, the caregiver initially depresses the upper engagement tab 68 on the latch lever 48. This force compresses the bias springs and causes the latch lever 48, including both the primary latch member 76 and the secondary latch member 82, to move downward a distance sufficient such that both the primary latch member 76 and the secondary latch member 82 will pass beneath the first catch 86 and the second catch 90 during the pivoting movement of the side panel from the upright closed position to the retracted open position. Thus, when a caregiver wishes to open the side panel, the caregiver only needs to hold the single upper engagement tab 68 in contact with the lower engagement tab 52 and both the primary latch member 76 and the secondary latch member 82 move away from the first and second latches such that the entire side panel can be rotated to the retracted, open position.

Figure 9:
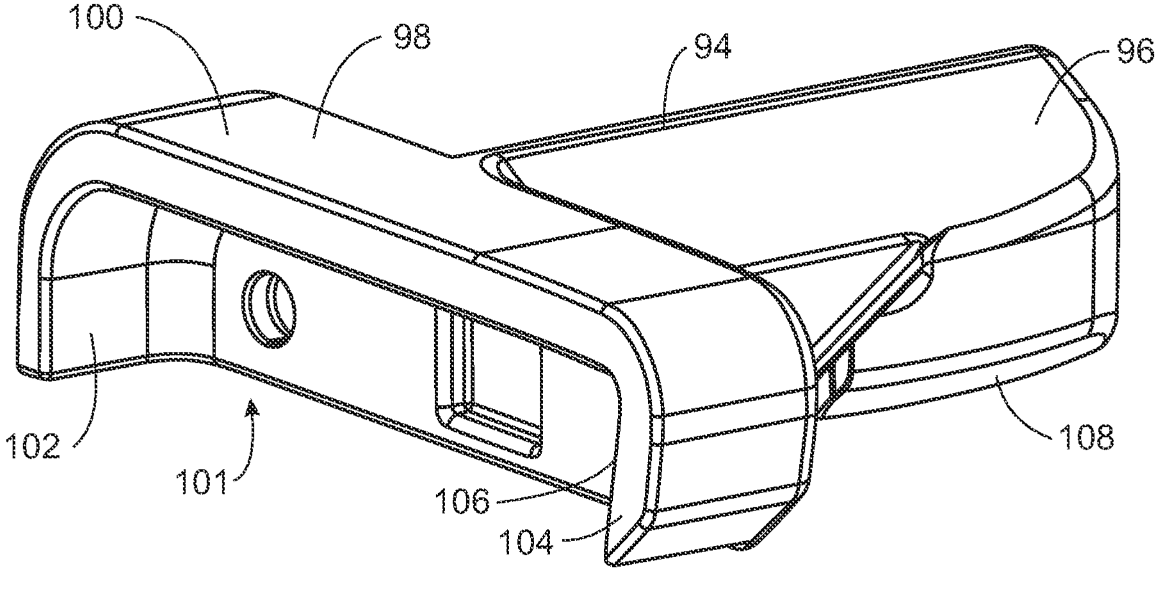
FIG. 9 is a perspective view of the latch receptacle of the second embodiment of the latch assembly of the present disclosure.

FIGS. 8 and 9 illustrate a second embodiment of a latch receptacle 94. The second embodiment of the latch receptacle 94 performs a similar function to the latch receptacle 84 shown in FIGS. 6 and 7 but has a slightly different configuration to allow the second latch receptacle 94 to be used with different types of incubators and infant warmers. In the second embodiment shown in FIGS. 8 and 9, the latch receptacle 94 includes a main body 96 that has a top surface 98. Once again, the second latch receptacle 94 is an injection molded plastic component that can be securely mounted to a stationary side panel of the incubator. The latch receptacle 94 includes a movement bracket 100 that is attached to the main body 96. The movement bracket 100 defines a movement channel 101 that extends between a first end 102 and a second end 104. The second end 104 defines a second catch 106. The second catch 106 extends far enough below the top surface 98 to contact the secondary latch member 82 if the latch lever 48 is not depressed. In addition to the second catch 106, the latch receptacle includes a first catch 108 that contacts and engages the primary latch member 76 when the panel latch assembly 20 is in the fully latched position as shown in FIG. 8.

As with the first embodiment of the latch receptacle 84 shown in FIG. 6, when the upper engagement tab 68 is depressed against the bias force created by the bias spring and moved toward the lower engagement tab 52, the primary latch member 76 and the secondary latch member 82 are moved far enough downward such that rotation of the side panel will allow the primary latch member 76 to pass beneath the first catch 108 while the secondary latch member 82 will pass beneath the second catch 106.

Figure 10:
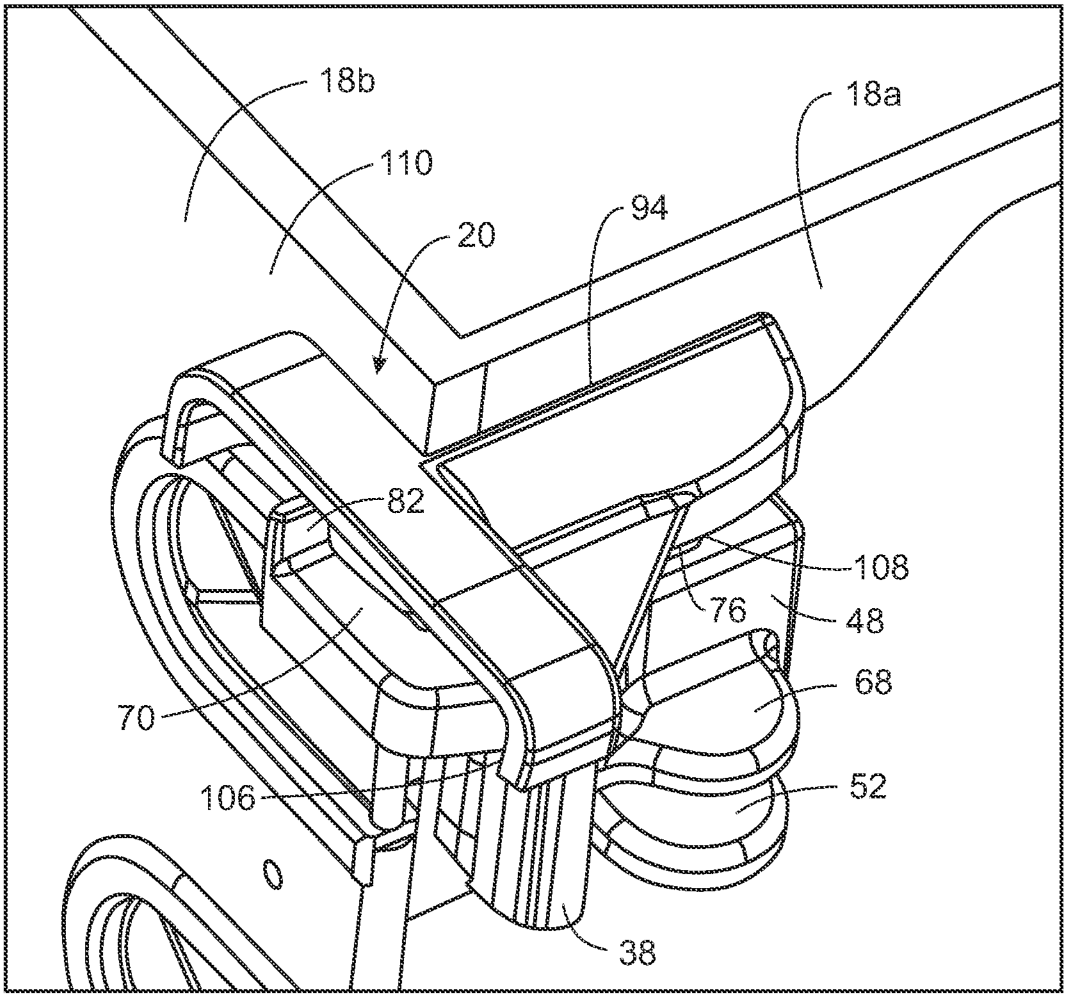
FIG. 10 is a perspective view of the second embodiment of the latch assembly mounted to the enclosure.
Figure 11:
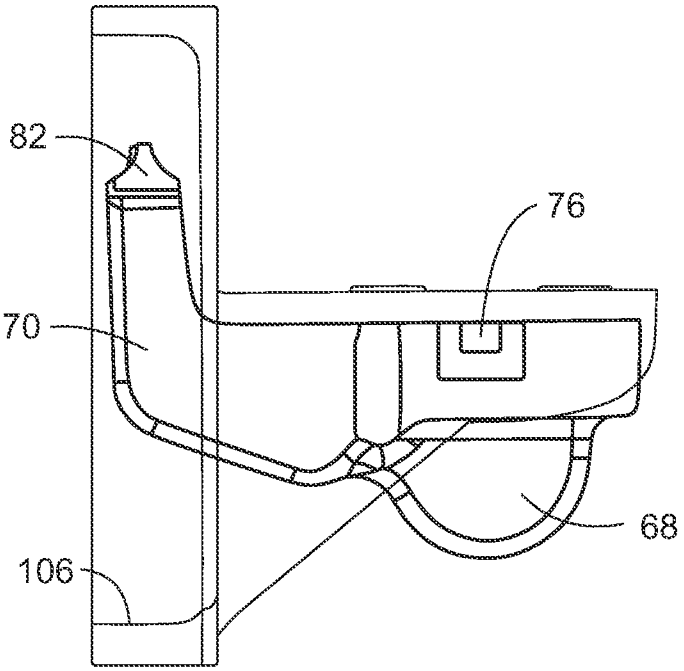
FIG. 11 is a top view of the second embodiment of the latch assembly in the first latching position.
Figure 12:
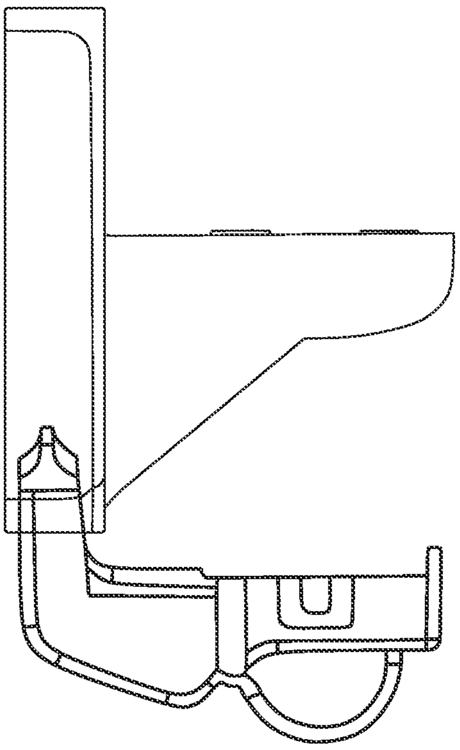
FIG. 12 is a top view of the second embodiment of the latch assembly in the second latching position.

FIG. 10 illustrates the installation of a complete side panel latch assembly 20 on the enclosure of an incubator that includes both the movable side panel 18*a* and a stationary side panel 18*b*. Specifically, the latch receptacle 94 is mounted to the side surface 110 of the stationary side panel 18*b* while the base 38 and latch lever 48 are mounted to the movable side panel 18*a*. In the embodiment shown in FIG. 10, the side panel latch assembly 20 is in the fully latched position in which the primary latch member 76 formed on the latch lever 48 is in contact with the first catch 108. In this condition, the movable side panel 18*a* cannot rotate away from the stationary side panel 18*b*. As can be seen in FIG. 10, in this latched position, the secondary latch member 82 is spaced from the second catch 106 based upon the design and configuration of the extension arm 70. Such a condition is also shown in the top view of FIG. 11.

As discussed previously, the inventors have identified a problem associated with current side panel latch assemblies that allow the movable side panel to open an amount that allows the previously available latch assemblies to be disengaged while the amount of rotation of the movable side panel is not enough to cause the weight of the side panel to move the side panel from the generally upright closed position to the fully retracted, open position. The inventors have recognized that the movable side panel could be opened up to 10-12° without the weight of gravity causing the movable side panel to fall to the fully retracted, open position. In this intermediate position, a caregiver may believe that the side panel is properly latched since the side panel appears to be in the upright closed position. However, such unlatched state may result in inadvertent opening of the side panel. Therefore, the panel latch assembly 20 of the present disclosure has been developed to provide full latching of the movable side panel 18 in this intermediate position.

Figure 13:
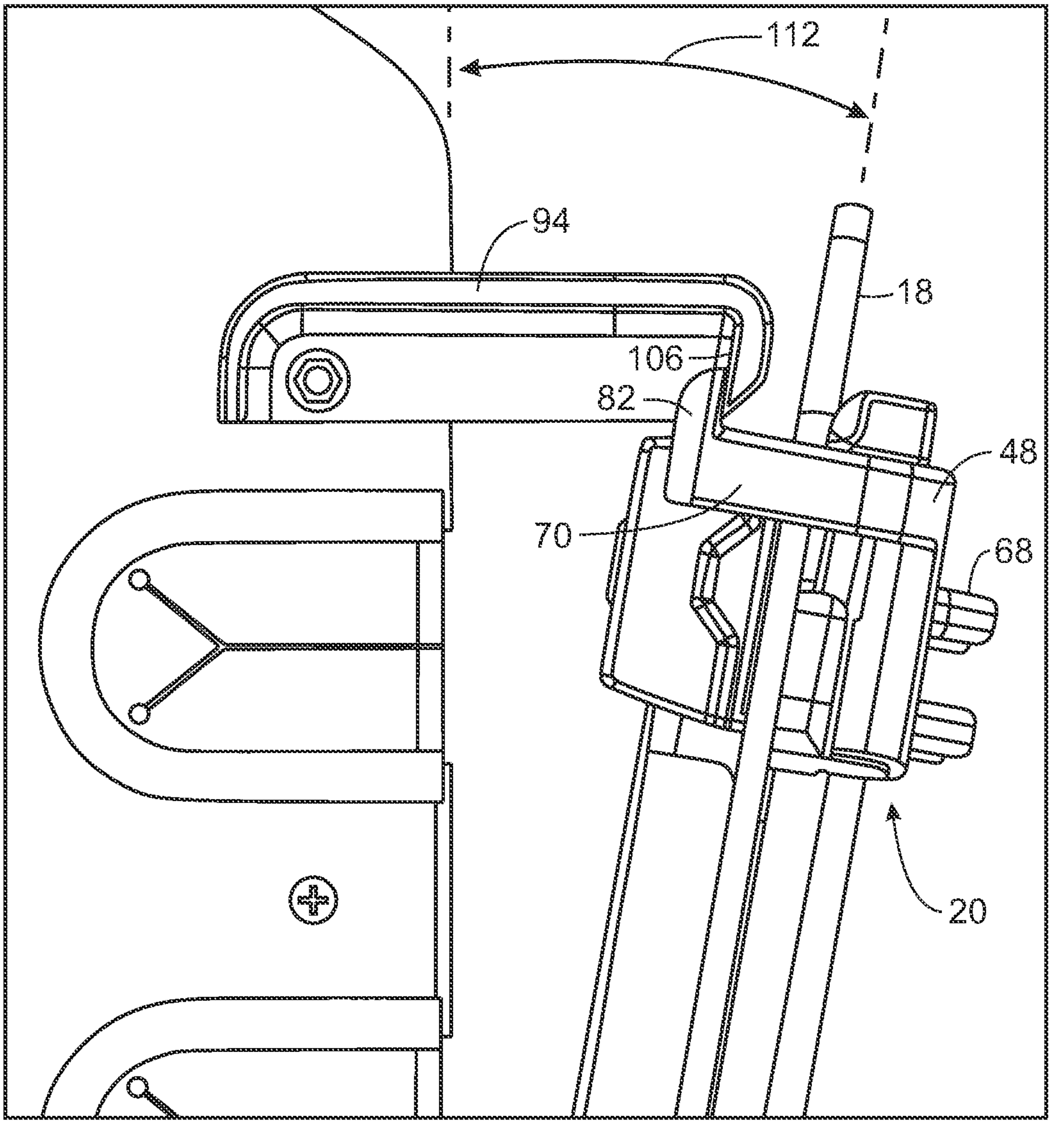
FIG. 13 is a side view of the second embodiment of the latch assembly showing latching of the side panel after movement from the closed position.
Figure 14:
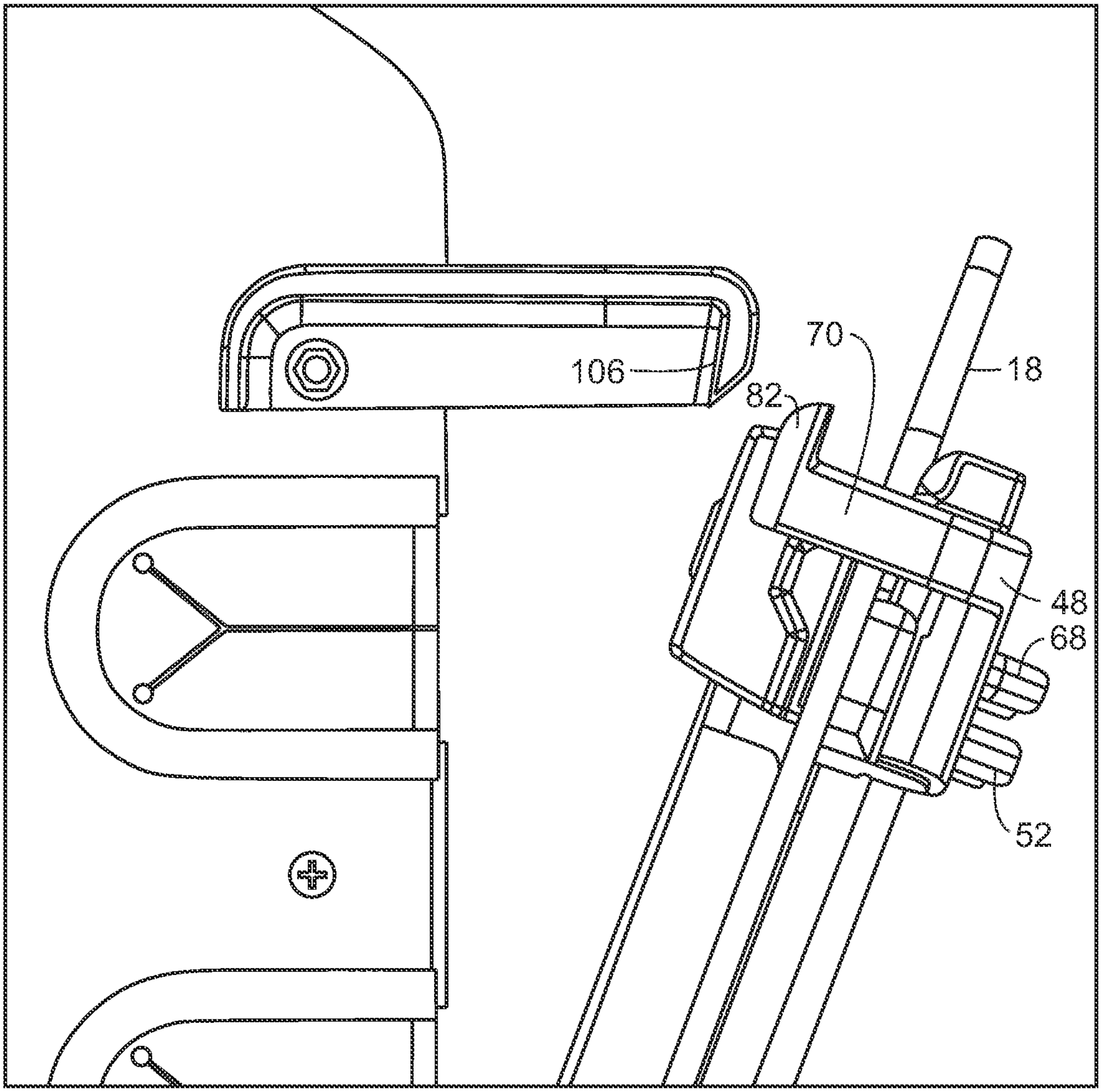
FIG. 14 is a side view of the second embodiment of the latch assembly showing movement of the side panel past the latch receptacle.

Referring now to FIG. 13, in this intermediate position, the side panel 18 has moved and rotated approximately 15° away from the upright position, as illustrated by angle 112 shown in FIG. 13. In prior art systems, when the side panel 18 is in this intermediate position, the side panel may not fall to the fully open position due to the weight of gravity but yet is in an unlatched state. In accordance with the side panel latch assembly 20 of the present disclosure, the secondary latch member 82 is in contact with the second catch 106 to prevent further rotation of the side panel 18 from the retained, intermediate position illustrated. If the caregiver wishes to fully rotate the side panel 18 to the open condition, the caregiver must again depress the upper engagement tab 68 to move the latch lever and associated secondary latch member 82 downward to move the secondary latch member 82 below the second catch 106. Once in this position, the movable side panel 18 can be further rotated until the secondary latch member 82 has rotated past the second catch 106. such as shown in FIG. 14. Once the secondary latch member 82 passes beneath the second catch 106, the upper engagement tab 68 can be released and the movable side panel 18 can freely rotate into the retracted, open position. Since the degree of rotation shown in FIG. 14 is past the angle 112 shown in FIG. 13, the weight of gravity will cause the movable side panel 18 to rotate downward into the retracted open position.

During use of the incubator, if the caregiver wishes to move the movable side panel 18 from the upright closed position to the retracted, open position, the caregiver need to depress the upper engagement tab 68 and hold the upper engagement tab 68 in the depressed position as the caregiver rotates the movable side panel 18. The caregiver must rotate the movable side panel 18 far enough until the secondary latch member 82 is moved past the second catch 106. Once this amount of rotation has occurred, the caregiver can release the upper engagement tab 68. Thus, the side panel latch assembly will be in a fully unlatched condition only after the side panel has rotated past the angle 112 shown in FIG. 13.

Figure 15:
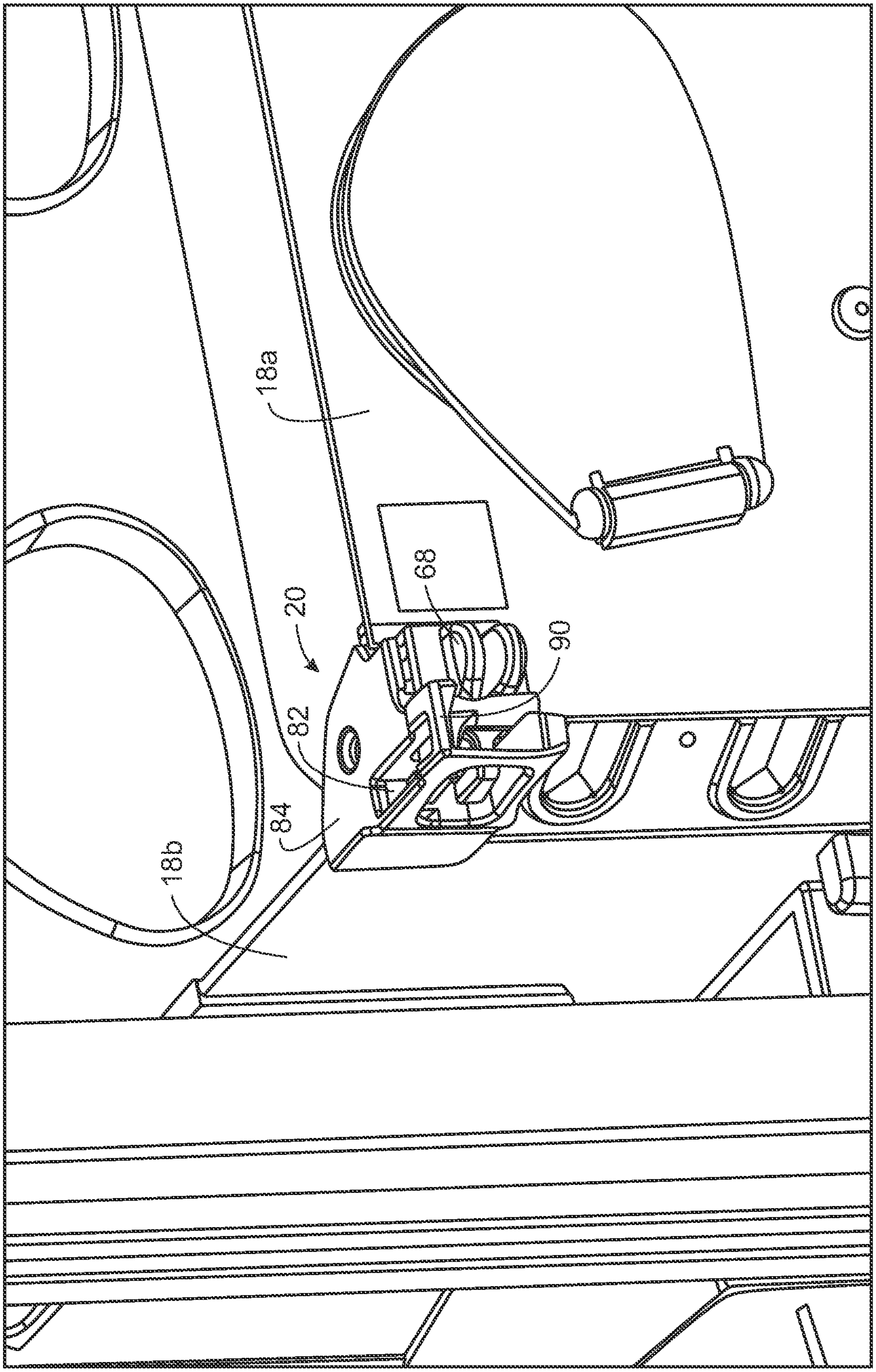
FIG. 15 is a is a perspective view of the first embodiment of the latch assembly mounted to the enclosure.

Referring now to FIG. 15, there shown is the first embodiment of the side panel latch assembly 20 which includes the alternate embodiment of the first latch receptacle 84. The first embodiment of the side panel latch assembly functions in the identical way as described above in that the secondary latch member 82 will engage the second catch 90 if the movable side panel is in a partially open condition. The upper engagement tab 68 must be fully depressed and the side panel 18*a* rotated far enough until the secondary latch member 82 passes beneath the second catch 90. This amount of rotation is sufficient to allow the weight of gravity to move the entire side panel to the retracted open position due to the weight of gravity.

Although the embodiments shown in the disclosure illustrate the latch receptacle mounted to a stationary side panel and the latch base and latch lever mounted to the movable side panel, it is contemplated that this orientation could be reversed. In such a configuration, the latch base and the latch lever would be mounted to a stationary side panel while the latch receptacle would be mounted to the movable side panel. In this alternate orientation, the latch lever and latch receptacle would interact with each other to hold the movable side panel in the upright closed position in a latched position. When the latch lever is depressed, the movement of the primary and secondary latch members would thus allow the rotation of the movable side panel to either the intermediate position or to the fully rotated, open position.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. A neonatal incubator system for use with an infant comprising:

an enclosure configured to create a chamber around the infant, the enclosure including:

a plurality of side panels, wherein at least one of the side panels is movable between an upright closed position and a retracted open position; and at least one latch assembly engageable with the at least one movable side panel when the at least one movable side panel is in the closed position to maintain the at least one movable side panel in the closed position, the at least one latch assembly comprising:

a latch receptacle having a first catch and a second catch;

a latch base; and a latch lever movably mounted to the latch base and including a primary latch member configured to engage the first catch and a secondary latch member configured to engage the second catch, wherein the primary latch member and the secondary latch member are laterally spaced from each other, wherein the primary latch member engages the first catch and the secondary latch member is spaced from the second catch when the at least one movable side panel is in the closed position.

2. The system of claim 1 wherein the latch lever is movable relative to the latch base between an extended latching position and a retracted release position, wherein the primary latch member is positioned out of engagement with the first catch and the secondary latch member is positioned out of engagement with the second catch when the latch lever is held in the retracted release position.

3. The system of claim 2 wherein the at least one movable side panel is movable between the upright closed position and the retracted open position when the latch lever is held in the retracted release position.

4. The system of claim 1 wherein the secondary latch member engages the second catch and the primary latch member is spaced from the first catch when the at least one movable side panel is in an intermediate position between the closed position and the open position.

5. The system of claim 4 wherein the secondary latch member engages the second catch when the at least one movable side panel rotates less than an amount necessary for gravity to move the at least one movable side panel to the retracted open position.

6. The system of claim 1 wherein both the primary latch member and the secondary latch member move away from the first and second catches with movement of the latch lever to a retracted release position, wherein the at least one movable side panel is movable between the upright closed position and the retracted open position when the latch lever is held in the retracted release position.

7. The system of claim 6 wherein the latch lever is biased into an engagement position by one or more bias springs and is movable into the retracted release position against the bias force created by the one or more bias springs.

8. The system of claim 1 wherein the latch receptacle is mounted to one of the stationary side panels and the latch base and latch lever are mounted to the at least one movable side panel.

9. The system of claim 1 further comprising at least one hinge on a bottom side of the movable side panel such that the at least one movable side panel rotates downward between the upright closed position and the retracted open position.

* * * * *